US012012920B2

(12) United States Patent
Hoppe et al.

(10) Patent No.: US 12,012,920 B2
(45) Date of Patent: Jun. 18, 2024

(54) CHARGE FORMING DEVICE WITH THROTTLE VALVE

(71) Applicant: Walbro LLC, Cass City, MI (US)

(72) Inventors: Jeffrey C. Hoppe, Cass City, MI (US); Duried F. Rabban, Henderson, NV (US); Bradley J. Roche, Millington, MI (US); David L. Speirs, Cass City, MI (US)

(73) Assignee: Walbro LLC, Cass City, MI (US)

( * ) Notice: Subject to any disclaimer, the term of this patent is extended or adjusted under 35 U.S.C. 154(b) by 0 days.

(21) Appl. No.: 18/132,641

(22) Filed: Apr. 10, 2023

(65) Prior Publication Data

US 2023/0243328 A1 Aug. 3, 2023

Related U.S. Application Data

(62) Division of application No. 17/606,527, filed as application No. PCT/US2020/030368 on Apr. 29, 2020, now Pat. No. 11,655,788.

(60) Provisional application No. 62/842,795, filed on May 3, 2019.

(51) Int. Cl.

| | |
|---|---|
| ***F02D 9/10*** | (2006.01) |
| ***F02M 69/04*** | (2006.01) |
| *F02M 35/10* | (2006.01) |

(52) U.S. Cl.

CPC .......... *F02M 69/044* (2013.01); *F02D 9/105* (2013.01); *F02D 9/1065* (2013.01); *F02D 2200/0404* (2013.01); *F02M 35/10216* (2013.01)

(58) Field of Classification Search

CPC .... F02M 19/10; F02M 19/0207; F02M 19/08; F02D 41/182; G01F 1/34

USPC .......................................................... 123/336

See application file for complete search history.

(56) References Cited

U.S. PATENT DOCUMENTS

| | | | |
|---|---|---|---|
| 3,887,661 | A | 6/1975 | Ojala |
| 4,694,797 | A | 9/1987 | Hamai |
| 6,116,215 | A | 9/2000 | Soleanicov et al. |
| 8,613,271 | B2 | 12/2013 | Deng et al. |
| 9,394,847 | B2 | 7/2016 | Sukegawa et al. |

(Continued)

FOREIGN PATENT DOCUMENTS

| | | | |
|---|---|---|---|
| CN | 102913330 | A | 2/2013 |
| CN | 103883412 | A | 6/2014 |

(Continued)

OTHER PUBLICATIONS

CN Office Action for CN Application No. 202080033122.4 dated May 20, 2023, (15 pages).

(Continued)

*Primary Examiner* — Long T Tran
*Assistant Examiner* — James J Kim
(74) *Attorney, Agent, or Firm* — Reising Ethington P.C.

(57) ABSTRACT

In at least some implementations, a charge forming device includes a body that has a throttle bore, a throttle valve associated with the throttle bore, a coupler and an actuator. The throttle has a valve head received within and movable relative to the throttle bore, and a valve shaft to which the valve head is coupled. The coupler is connected to the valve shaft and carries or includes a sensor element. And the actuator has a drive shaft coupled to the coupler so that rotation of the drive shaft is transmitted to the coupler and the valve shaft.

9 Claims, 8 Drawing Sheets

(56) References Cited

U.S. PATENT DOCUMENTS

| | | | | |
|---|---|---|---|---|
| 9,562,496 | B1 | 2/2017 | Roberts et al. | |
| 9,631,736 | B2 | 4/2017 | Kus et al. | |
| 9,651,455 | B2 | 5/2017 | Bowling et al. | |
| 10,815,908 | B2 * | 10/2020 | Radue | F02M 35/10249 |
| 2002/0084436 | A1 * | 7/2002 | Rauch | F02D 9/1065<br>251/367 |
| 2006/0157027 | A1 * | 7/2006 | Ichikawa | F02D 11/10<br>123/399 |
| 2013/0054121 | A1 | 2/2013 | Casoni et al. | |
| 2014/0158092 | A1 | 6/2014 | Sukegawa et al. | |
| 2015/0337743 | A1 * | 11/2015 | Cowan | F02D 9/10<br>261/64.2 |
| 2016/0131071 | A1 | 5/2016 | Sugimoto et al. | |
| 2016/0290245 | A1 | 10/2016 | Okubo et al. | |
| 2016/0305348 | A1 | 10/2016 | Gangler et al. | |
| 2019/0120193 | A1 * | 4/2019 | Burns | F02M 7/18 |
| 2019/0277202 | A1 * | 9/2019 | Guiduzzi | F16K 31/041 |

FOREIGN PATENT DOCUMENTS

| | | | |
|---|---|---|---|
| JP | S6296776 | A | 5/1987 |
| WO | WO2019070656 | A1 | 4/2019 |

OTHER PUBLICATIONS

Written Opinion & International Search Report for PCT/US2020/030368 dated Aug. 3, 2020, 13 pages.

* cited by examiner

CHARGE FORMING DEVICE WITH THROTTLE VALVE

REFERENCE TO CO-PENDING APPLICATION

This application is a divisional of U.S. patent application Ser. No. 17/606,527 filed Oct. 26, 2021, which is a national phase of PCT/US2020/030368, filed Apr. 29, 2020 and claims the benefit of U.S. Provisional Application Ser. No. 62/842,795 filed on May 3, 2019. The entire contents of these priority applications are incorporated herein by reference.

TECHNICAL FIELD

The present disclosure relates generally to a throttle valve associated with a rotary position sensor.

BACKGROUND

Fuel systems including electronic fuel injectors typically provide fuel at relatively high pressure to and from the fuel injectors. The injection pressure may be constant so that the duration over which the injector is open determines the amount of fuel discharged from the injector. Such systems may be relatively complex and require multiple sensors some of which may be relatively costly, like oxygen sensors in an exhaust gas, and high pressure pumps to provide fuel to the injectors at the high pressure. Such fuel systems are too expensive and complex for a wide range of engine applications.

SUMMARY

In at least some implementations, a charge forming device includes a body that has a throttle bore, a throttle valve associated with the throttle bore, a coupler and an actuator. The throttle has a valve head received within and movable relative to the throttle bore, and a valve shaft to which the valve head is coupled. The coupler is connected to the valve shaft and carries or includes a sensor element. And the actuator has a drive shaft coupled to the coupler so that rotation of the drive shaft is transmitted to the coupler and the valve shaft.

In at least some implementations, the coupler includes a first drive feature engaged with the drive shaft and a second drive feature engaged with the valve shaft. In at least some implementations, the coupler includes an anti-rotation feature and the sensor element includes an anti-rotation feature that is engaged with the anti-rotation feature of the coupler to prevent rotation of the sensor element relative to the coupler. The anti-rotation features of both the coupler and the sensor element may be defined by at least one flat surface. The coupler may include a cavity in which the sensor element is at least partially received, and the anti-rotation feature of the coupler may be defined by a surface that defines the cavity.

In at least some implementations, the coupler is flexible and may twist to permit movement of drive shaft relative to the throttle valve shaft when sufficient force is applied to the coupler. And the coupler is resilient so that the coupler untwists when the force causing the twisting is decreased sufficiently to permit untwisting of the coupler.

In at least some implementations, the device includes a circuit board and a sensor on the circuit board that is responsive to movement of the sensor element, and the coupler is mounted to an end of the throttle valve shaft that is closest to the circuit board. The throttle valve shaft or the drive shaft may extend through a void in the circuit board. The actuator may be located adjacent to a first side of the circuit board and the coupler may be located adjacent to a second side of the circuit board that is opposite to the first side.

In at least some implementations, a charge forming device includes a fuel injector having an electrically actuated valve and an outlet port, and fuel flows through the outlet port when the valve is open, and a pressure sensor arranged so that the pressure sensor is communicated with the pressure in the area of the outlet port.

In at least some implementations, the device also includes a controller communicated with the pressure sensor, and wherein the controller controls opening of the valve at least in part as a function of the pressure at the pressure sensor.

In at least some implementations, the device also includes a body having a throttle bore, and wherein the outlet port opens into the throttle bore and the body includes a passage that opens into the throttle bore in the area of the outlet port. The passage is communicated with the pressure sensor so that an output of the pressure sensor is indicative of the pressure within the passage. In at least some implementations, the throttle bore has an axis and a plane perpendicular to the axis and intersecting the outlet port is within one inch of an end of the passage that is open to the throttle bore.

In at least some implementations, the device also comprises a body having a throttle bore with a venturi located within the throttle bore, and wherein the outlet port opens into the venturi, and wherein the pressure sensor is responsive to the pressure within the area of the venturi. The body may include a passage that has a first end that is open to the throttle bore within one inch of the venturi and wherein the passage is communicated with the pressure sensor.

In at least some implementations, a method of controlling fuel injection events includes sensing the pressure at or near a fuel injector outlet and opening a valve of the fuel injector when the pressure at or near the fuel injector is a negative relative pressure. In at least some implementations, the method also includes determining the portion of a negative pressure signal in which to open the valve. In at least some implementations, the method also comprises comparing the sensed pressure to a threshold and opening the valve when the pressure exceeds the threshold. In at least some implementations, opening of the valve is controlled as a function of the magnitude of the pressure at or near the outlet of the fuel injector. And in at least some implementations, the pressure is continuously measured or sensed, or sampled at fixed rate.

BRIEF DESCRIPTION OF THE DRAWINGS

The following detailed description of certain embodiments and best mode will be set forth with reference to the accompanying drawings, in which.

DETAILED DESCRIPTION

Figure 1:
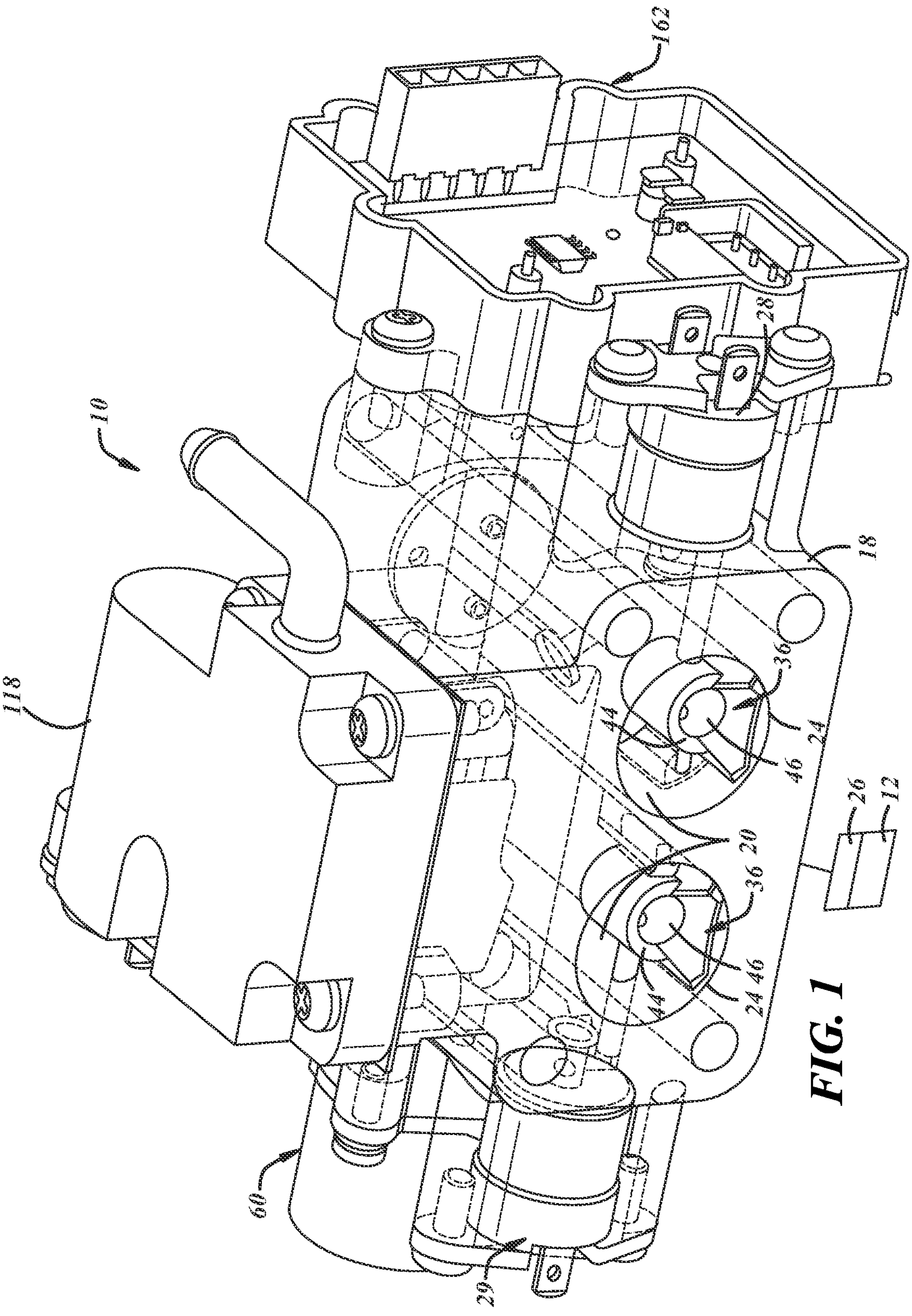
FIG. 1 is a perspective view of a throttle body assembly having multiple bores from which a fuel and air mixture may be delivered to an engine, a main body of the throttle body assembly is shown transparent to show certain internal components and features.
Figure 2:
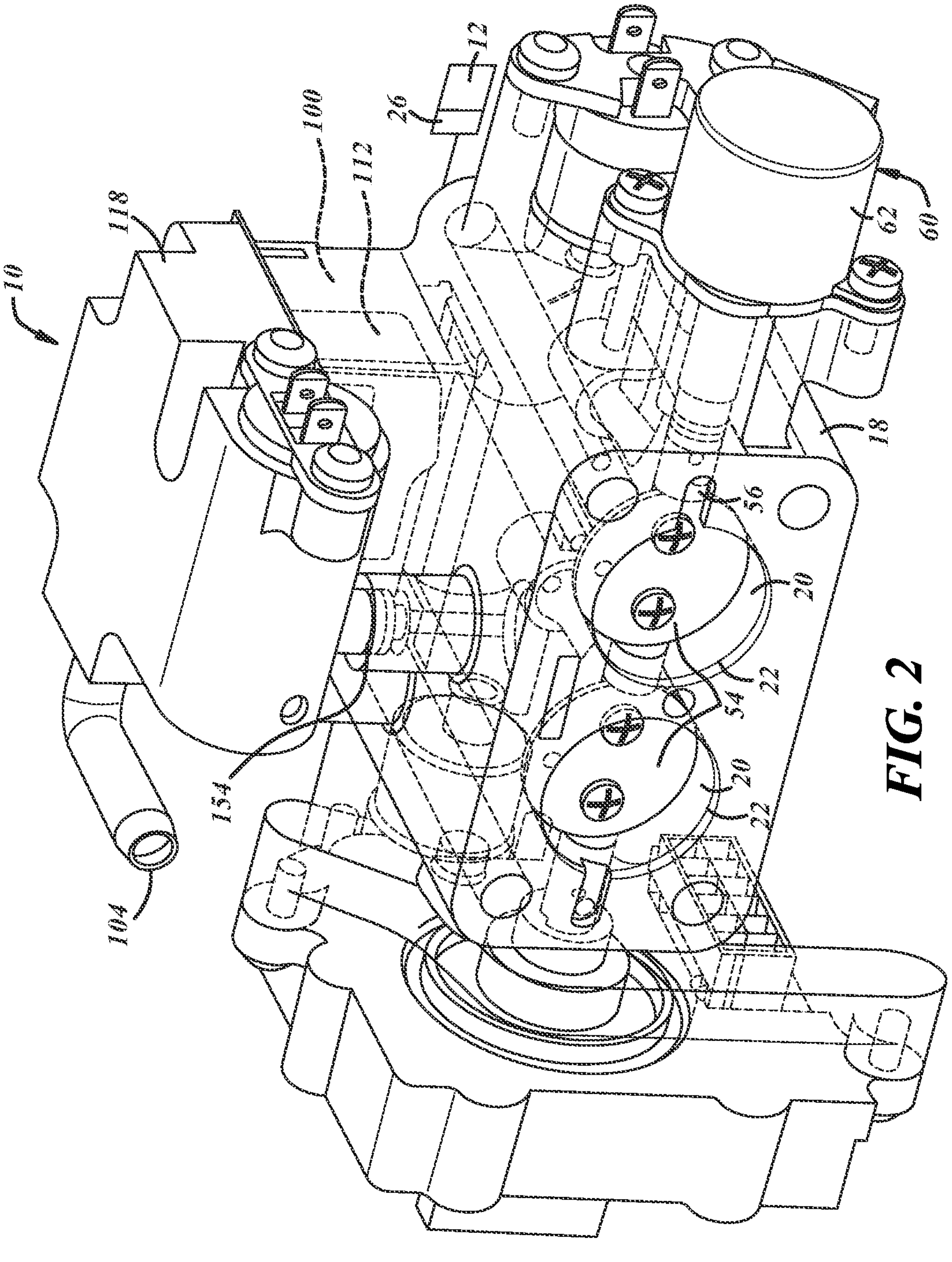
FIG. 2 is another perspective view of the throttle body assembly.
Figure 3:
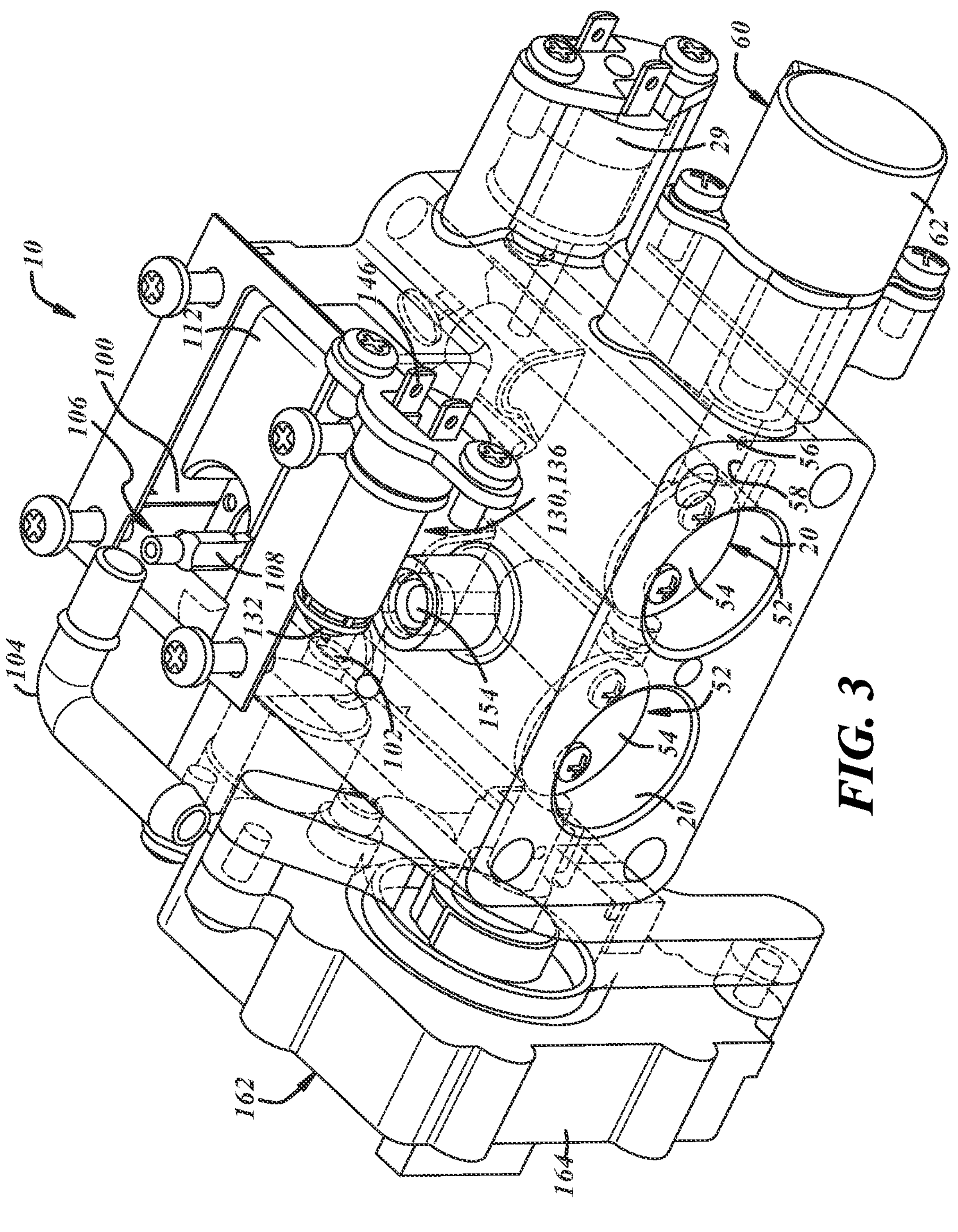
FIG. 3 is another perspective view of the throttle body assembly with a vapor separator cover removed.

Referring in more detail to the drawings, FIGS. 1-3 illustrate a charge forming device 10 that provides a combustible fuel and air mixture to an internal combustion engine 12 (shown schematically in FIG. 1) to support operation of the engine. The charge forming device 10 may be utilized on a two or four-stroke internal combustion engine, and in at least some implementations, includes a throttle body assembly 10 from which air and fuel are discharged for delivery to the engine.

The assembly 10 includes a housing having a throttle body 18 that has more than one throttle bore 20 (shown as two separate bores extending through the body parallel to each other) each having an inlet 22 (FIG. 2) through which air is received into the throttle bore 20 and an outlet 24 (FIG. 1) connected or otherwise communicated with the engine (e.g. an intake manifold 26 thereof). The inlets may receive air from an air filter (not shown), if desired, and that air may be mixed with fuel provided from separate fuel metering valves 28, 29 carried by or communicated with the throttle body 18. The intake manifold 26 generally communicates with a combustion chamber or piston cylinder of the engine during sequentially timed periods of a piston cycle. For a four-stroke engine application, as illustrated, the fluid may flow through an intake valve and directly into the piston cylinder. Alternatively, for a two-stroke engine application, typically air flows through the crankcase (not shown) before entering the combustion chamber portion of the piston cylinder through a port in the cylinder wall which is opened intermittently by the reciprocating engine piston.

Figure 4:
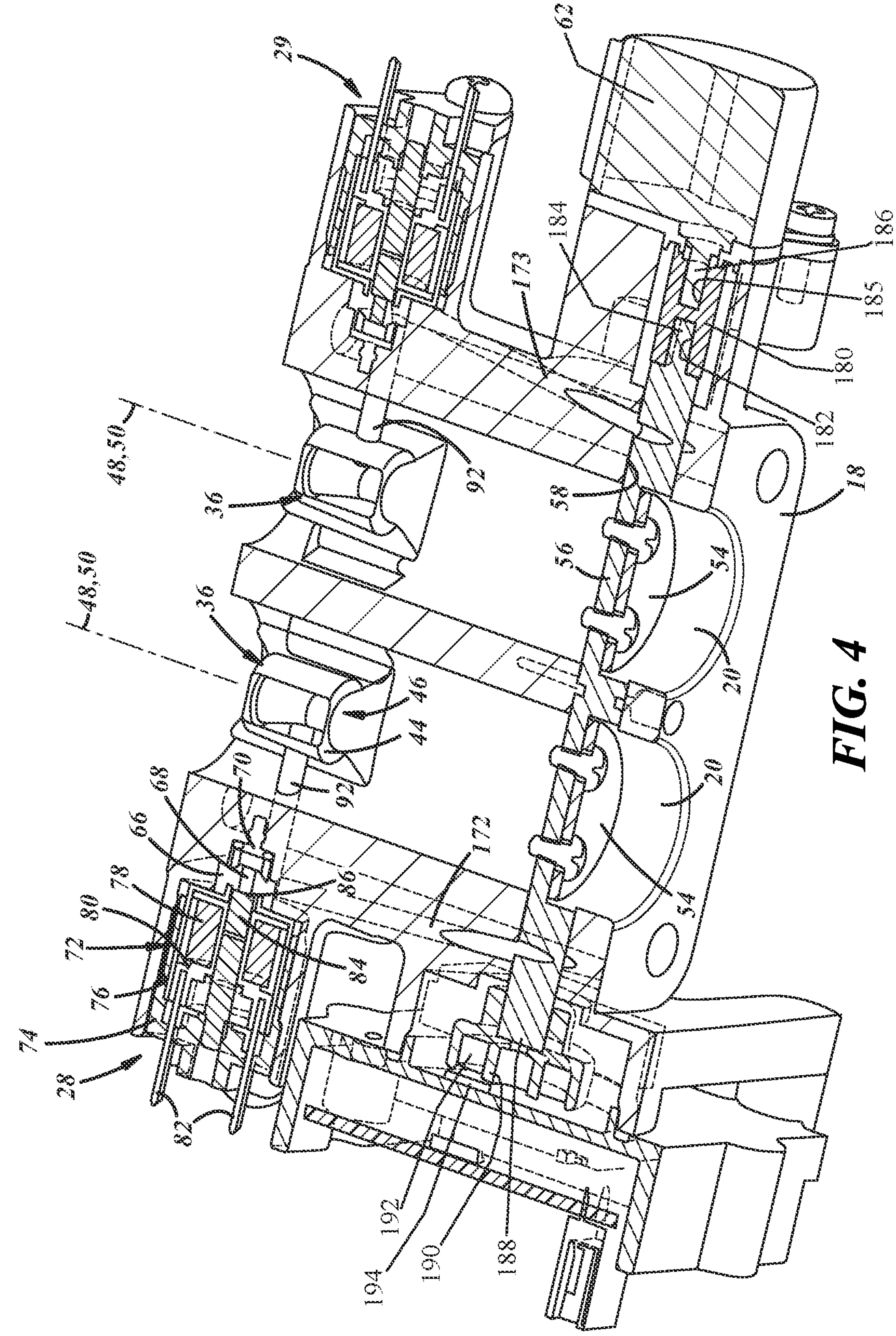
FIG. 4 is a perspective sectional view of a throttle body assembly.

The throttle bores 20 may have any desired shape including (but not limited to) a constant diameter cylinder or a venturi shape wherein the inlet leads to a tapered converging portion that leads to a reduced diameter throat that in turn leads to a tapered diverging portion that leads to the outlet 24. The converging portion may increase the velocity of air flowing into the throat and create or increase a pressure drop in the area of the throat. In at least some implementations, a secondary venturi, sometimes called a boost venturi 36 may be located within one or more of the throttle bores 20 whether the throttle bore 20 has a venturi shape or not. The boost venturis may be the same, if desired, and only one will be described further. The boost venturi 36 may have any desired shape, and as shown in FIGS. 1 and 4, has a converging inlet portion that leads to a reduced diameter intermediate throat that leads to a diverging outlet. The boost venturi 36 may be coupled the to throttle body 18 within the throttle bore 20, and in some implementations, the throttle body may be cast from a suitable metal and the boost venturi 36 may be formed as part of the throttle body, in other words, from the same piece of material cast as a feature of the throttle body when the remainder of the throttle body is formed. The boost venturi 36 may also be an insert coupled in any suitable manner to the throttle body 18 after the throttle body is formed. In the example shown, the boost venturi 36 includes a wall 44 that defines an inner passage 46 that is open at both its inlet and outlet to the throttle bore 20. A portion of the air that flows through the throttle body 18 flows into and through the boost venturi 36 which increases the velocity of that air and decreases the pressure thereof. The boost venturi 36 may have a center axis 48 (FIG. 4) that may be generally parallel to a center axis 50 (FIG. 4) of the throttle bore 20 and radially offset therefrom, or the boost venturi 36 may be oriented in any other suitable way.

Referring to FIG. 1, the air flow rate through the throttle bore 20 and into the engine is controlled at least in part by one or more throttle valves 52. In at least some implementations, the throttle valve 52 includes multiple heads 54 received one in each bore 20, each head may include a flat plate coupled to a rotating throttle valve shaft 56. The shaft 56 extends through a shaft bore 58 formed in the throttle body 18 that intersects and may be generally perpendicular to the throttle bores 20. The throttle valve 52 may be driven or moved by an actuator 60 between an idle position wherein the heads 54 substantially block air flow through the throttle bores 20 and a fully or wide-open position wherein the heads 54 provide the least restriction to air flow through the throttle bores 20. In one example, the actuator 60 may be an electrically driven motor 62 coupled to the throttle valve shaft 56 to rotate the shaft and thus rotate the valve heads 54 within the throttle bores 20. In another example, the actuator 60 may include a mechanical linkage, such as a lever attached to a throttle valve shaft 56 to which a Bowden wire may be connected to manually rotate the shaft 56 as desired and as is known in the art. In this way, multiple valve heads may be carried on a single shaft and rotated in unison within different throttle bores. A single actuator may drive the throttle valve shaft, and a single throttle position sensor may be used to determine the rotary position of the throttle valve (e.g. the valve heads 54 within the throttle bores 20).

The fuel metering valves 28 may be the same for each bore 20 and so only one is described further. The fuel metering valve 28 may have an inlet 66 to which fuel is delivered, a valve element 68 (e.g. a valve head) that controls fuel flow rate and an outlet 70 downstream of the valve element 68. To control actuation and movement of the valve element 68, the fuel metering valve 28 may include or be associated with an electrically driven actuator 72 such as (but not limited to) a solenoid. Among other things, the solenoid 72 may include an outer casing 74 received within a cavity 76 in the throttle body 18, a coil 78 wrapped around a bobbin 80 received within the casing 74, an electrical connector 82 arranged to be coupled to a power source to selectively energize the coil 78, and an armature 84 slidably received within the bobbin 80 for reciprocation between advanced and retracted positions. The valve element 68 may be carried by or otherwise moved by the armature 84 relative to a valve seat 86 that may be defined within one or both of the solenoid 72 and the throttle body 18. When the armature 84 is in its retracted position, the valve element 68 is removed or spaced from the valve seat 86 and fuel may flow through the valve seat. When the armature 84 is in its extended position, the valve element 68 may be closed against or bears on the valve seat 86 to inhibit or prevent fuel flow through the valve seat. In the example shown, the valve seat 86 is defined within the cavity 76 of the throttle body 18 and may be defined by a feature of the throttle body or by a component inserted into and carried by the throttle body or the solenoid casing 74. The solenoid 72 may be constructed as set forth in U.S. patent application Ser. No. 14/896,764. The inlet 68 may be centrally or generally coaxially located with the valve seat 86, and the outlet 70 may be radially outwardly spaced from the inlet and generally radially outwardly oriented. Of course, other metering valves, including but not limited to different solenoid valves or commercially available fuel injectors, may be used instead if desired in a particular application.

Fuel that flows through the valve seat 86 (e.g. when the valve element 68 is moved from the valve seat by retraction of the armature 84), flows to the metering valve outlet 70 for delivery into the throttle bore 20. In at least some implementations, fuel that flows through the outlet 70 is directed into the boost venturi 36, when a boost venturi 36 is included in the throttle bore 20. In implementations where the boost venturi 36 is spaced from the outlet 70, an outlet tube 92 (FIG. 4) may extend from a passage or port defining at least part of the outlet 70 and through an opening in the boost venturi wall 44 to communicate with the boost venturi passage 46. The tube 92 may extend into and communicate with the throat 40 of the boost venturi 36 wherein a negative or subatmospheric pressure signal may be of greatest magnitude, and the velocity of air flowing through the boost venturi 36 may be the greatest. Of course, the tube 92 may open into a different area of the boost venturi 36 as desired. Further, the tube 92 may extend through the wall 44 so that an end of the tube projects into the boost venturi passage 46, or the tube may extend through the boost venturi passage so that an end of the tube intersects the opposite wall of the boost venturi and may include holes, slots or other features through which fuel may flow into the boost venturi passage 46, or the end of the tube may be within the opening 94 and recessed or spaced from the passage (i.e. not protruding into the passage).

Figure 6:
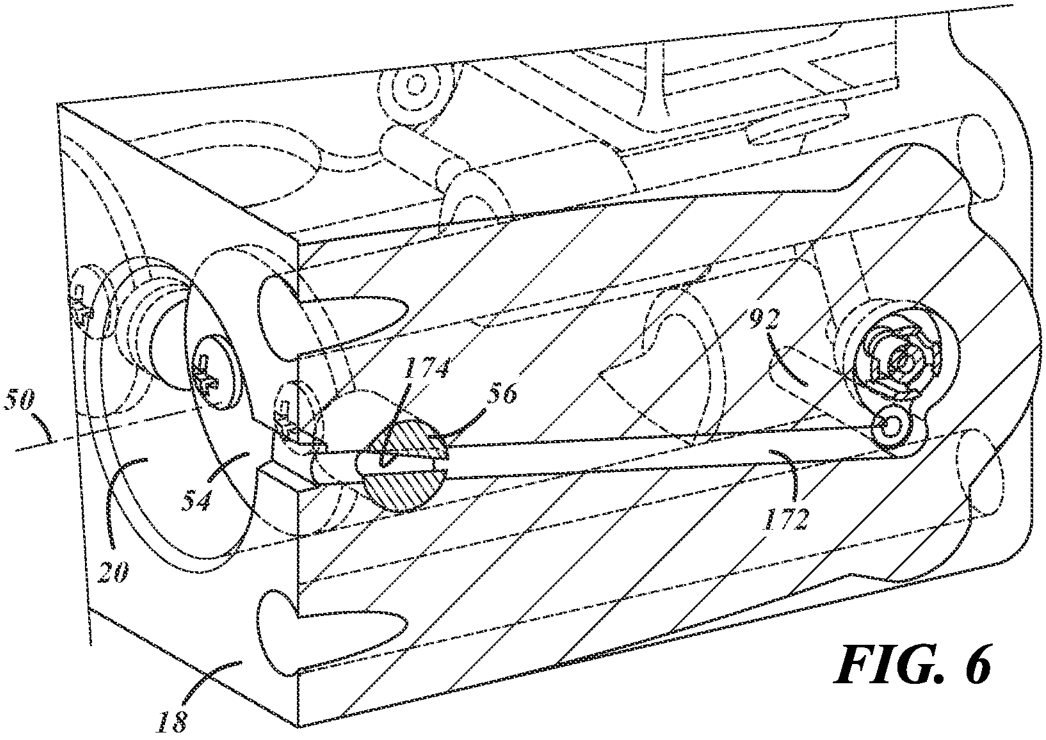
FIG. 6 is an enlarged, fragmentary perspective view of a portion of a throttle body assembly showing an air induction path and valve.

Further, as shown in FIGS. 4 and 6, air induction passages 172, 173 may be used with each or any one of multiple metering valves 28 when more than one metering valve is used. The air induction passages 172, 173 may extend from a portion of the throttle bores 20 upstream of the fuel outlet of the metering valve with which it is associated and may communicate with the fuel passage leading to the fuel outlet of the metering valve. In the example shown, the air induction passages 172, 173 lead from an inlet end 22 of the throttle body 18 and to the fuel outlet passages.

In the example where a fuel tube 92 extends into a boost venturi 36, the induction passages 172, 173 may extend into or communicate with the fuel tube (as shown in FIG. 6) to provide air from the induction passages and fuel from the metering valves 28 into the fuel tubes 92 where it may be mixed with air flowing through the throttle bores 20 and boost venturis 36.

A jet of other flow controller may be provided in the induction passages 172, 173 to control the flow rate of air in the passages, if desired. In addition to or instead of a jet or other flow controller, the flow rate through the induction passages 172, 173 may be controlled at least in part by a valve. The valve could be located anywhere along the passages 172, 173, including upstream of the inlet of the passages. In at least one implementation, the valve may be defined at least in part by the throttle valve shaft 56. In this example, the induction passage 172 intersects or communicates with the throttle shaft bore so that air that flows through the induction passages flows through the throttle shaft bore before the air is discharged into the throttle bore. Separate voids, like holes 174 or slots, may be formed in the throttle valve shaft 56 (e.g. through the shaft, or into a portion of the periphery of the shaft) and aligned with the passages 172, 173, as shown in FIG. 6. As the throttle valve shaft 56 rotates, the extent to which the void is aligned or registered with the induction passage changes. Thus, the effective or open flow area through the valve changes which may change the flow rate of air provided from the induction passage. If desired, in at least one position of the throttle valve, the voids may be not open at all to the induction passages such that air flow from the induction passages past the throttle valve bore does not occur or is substantially prevented. Hence, the air flow provided from the induction passages to the throttle bore may be controlled at least in part as a function of the throttle valve position.

Fuel may be provided from a fuel source to the metering valve inlet 66 and, when the valve element 68 is not closed on the valve seat 86, fuel may flow through the valve seat and the metering valve outlet 70 and to the throttle bore 20 to be mixed with air flowing therethrough and to be delivered as a fuel and air mixture to the engine. The fuel source may provide fuel at a desired pressure to the metering valve 28. In at least some implementations, the pressure may be ambient pressure or a slightly superatmospheric pressure up to about, for example, 6 psi above ambient pressure.

To provide fuel to the metering valve inlet 66, the throttle body assembly 10 may include an inlet chamber 100 (FIG. 3) into which fuel is received from a fuel supply, such as a fuel tank. The throttle body assembly 10 may include a fuel inlet 104 leading to the inlet chamber 100. In a system wherein the fuel pressure is generally at atmospheric pressure, the fuel flow may be fed under the force of gravity to the inlet chamber 100. In at least some implementations, as shown in FIGS. 3 and 4, a valve assembly 106 may control the flow of fuel into the inlet chamber 100. The valve assembly 106 may include a valve element 108 and may include or be associated with a valve seat so that a portion of the valve element 108 is selectively engageable with the valve seat to inhibit or prevent fluid flow through the valve seat, as will be described in more detail below. The valve element 108 may be coupled to an actuator 112 that moves the valve 108 relative to the valve seat, as will be set forth in more detail below. A vent port or passage 102 (FIGS. 4 and 5) may be communicated with the inlet chamber and with the engine intake manifold or elsewhere as desired so long as the desired pressure within the inlet chamber 100 is achieved in use, which may include atmospheric pressure. The level of fuel within the inlet chamber 100 provides a head or pressure of the fuel that may flow through the metering valve 28 when the metering valve is open.

To maintain a desired level of fuel in the inlet chamber 100, the valve 108 is moved relative to the valve seat by the actuator 112 which, in the example shown, includes or is defined by a float that is received in the inlet chamber and is responsive to the level of fuel in the inlet chamber. The float 112 may be buoyant in fuel and provide a lever pivotally coupled to the throttle body 18 or a cover 118 coupled to the body 18 on a pin and the valve 108 may be connected to the float 112 for movement as the float moves in response to changes in the fuel level within the inlet chamber 100. When a desired maximum level of fuel is present in the inlet chamber 100, the float 112 has been moved to a position in the inlet chamber wherein the valve 108 is engaged with and closed against the valve seat, which closes the fuel inlet 104 and prevents further fuel flow into the inlet chamber 100. As fuel is discharged from the inlet chamber 100 (e.g. to the throttle bore 20 through the metering valve 28), the float 112 moves in response to the lower fuel level in the inlet chamber and thereby moves the valve 108 away from the valve seat so that the fuel inlet 104 is again open. When the fuel inlet 104 is open, additional fuel flows into the inlet chamber 100 until a maximum level is reached and the fuel inlet 104 is again closed.

The inlet chamber 100 may be defined at least partially by the throttle body 18, such as by a recess formed in the throttle body, and a cavity in the cover 118 carried by the throttle body and defining part of the housing of the throttle body assembly 10. Outlets 120 (FIG. 5) of the inlet chamber 100 leads to the metering valve inlet 66 of each metering valve 28, 29. So that fuel is available at the metering valve 28 at all times when fuel is within the inlet chamber 100, the outlet 120 may be an open passage without any intervening valve, in at least some implementations. The outlet 120 may extend from the bottom or a lower portion of the inlet chamber so that fuel may flow under atmospheric pressure to the metering valve 28.

In use of the throttle body assembly 10, fuel is maintained in the inlet chamber 100 as described above and thus, in the outlet 120 and the metering valve inlet 66. When the metering valve 28 is closed, there is no, or substantially no, fuel flow through the valve seat 86 and so there is no fuel flow to the metering valve outlet 70 or to the throttle bore 20. To provide fuel to the engine, the metering valve 28 is opened and fuel flows into the throttle bore 20, is mixed with air and is delivered to the engine as a fuel and air mixture. The timing and duration of the metering valve opening and closing may be controlled by a suitable microprocessor or other controller. The fuel flow (e.g. injection) timing, or when the metering valve 28 is opened during an engine cycle, can vary the pressure signal at the outlet 70 and hence the differential pressure across the metering valve 28 and the resulting fuel flow rate into the throttle bore 20. Further, both the magnitude of the engine pressure signal and the airflow rate through the throttle valve 52 change significantly between when the engine is operating at idle and when the engine is operating at wide open throttle. In conjunction, the duration that the metering valve 28 is opened for any given fuel flow rate will affect the quantity of fuel that flows into the throttle bore 20.

The inlet chamber 100 may also serve to separate liquid fuel from gaseous fuel vapor and air. Liquid fuel will settle into the bottom of the inlet chamber 100 and the fuel vapor and air will rise to the top of the inlet chamber where the fuel vapor and air may flow out of the inlet chamber through the vent passage 102 or vent outlet (and hence, be delivered into the intake manifold and then to an engine combustion chamber). To control the venting of gasses from the inlet chamber 100, a vent valve 130 may be provided at the vent passage 102. The vent valve 130 may include a valve element 132 that is moved relative to a valve seat to selectively permit fluid flow through the vent or vent passage 102. To permit further control of the flow through the vent passage 102, the vent valve 130 may be electrically actuated to move the valve element 132 between open and closed positions relative to the valve seat 134.

Figure 5:
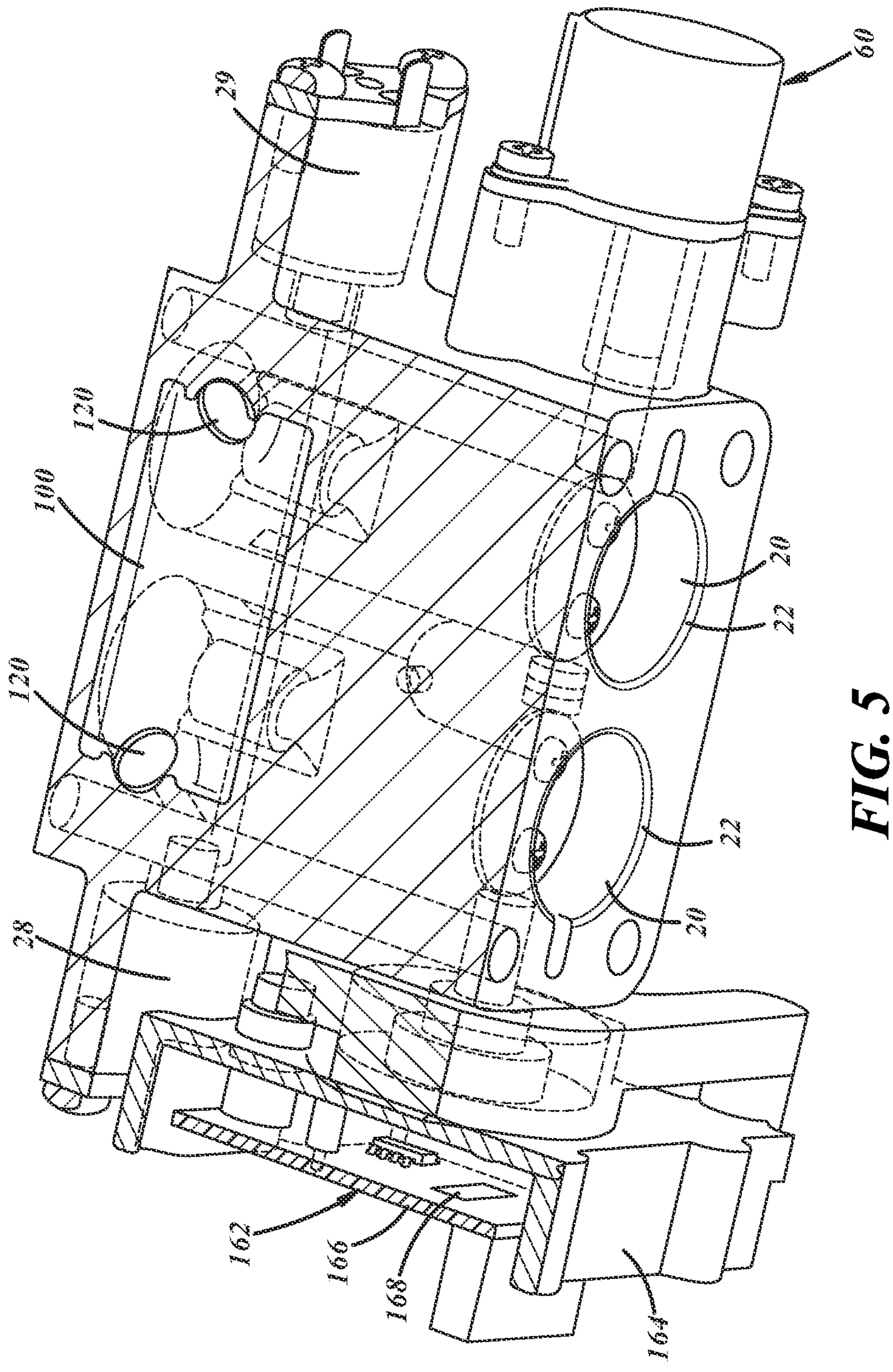
FIG. 5 is a perspective sectional view of a throttle body assembly.

As shown in FIGS. 4 and 5, to control actuation and movement of a valve element 132, the vent valve 130 may include or be associated with an electrically driven actuator such as (but not limited to) a solenoid 136. Among other things, the solenoid 136 may include an outer casing received within a cavity in the throttle body 18 or cover 118 and retained therein by a retaining plate or body, a coil wrapped around a bobbin received within the casing, an electrical connector 146 arranged to be coupled to a power source to selectively energize the coil, an armature slidably received within the bobbin for reciprocation between advanced and retracted positions and an armature stop. The valve element 132 may be carried by or otherwise moved by the armature relative to a valve seat that may be defined within one or more of the solenoid 136, the throttle body 18 and the cover 118. When the armature is in its retracted position, the valve element 132 is removed or spaced from the valve seat and fuel may flow through the valve seat. When the armature 148 is in its extended position, the valve element 132 may be closed against or bears on the valve seat 134 to inhibit or prevent fuel flow through the valve seat. The solenoid 136 may be constructed as set forth in U.S. patent application Ser. No. 14/896,764. Of course, other valves, including but not limited to different solenoid valves (including but not limited to piezo type solenoid valves) or other electrically actuated valves may be used instead if desired in a particular application.

The vent passage 102 or vent outlet could be coupled to a filter or vapor canister that includes an adsorbent material, such as activated charcoal, to reduce or remove hydrocarbons from the vapor. The vent passage 102 could also or instead be coupled to an intake manifold of the engine where the vapor may be added to a combustible fuel and air mixture provided from the throttle bore 20. In this way, vapor and air that flow through the vent valve 130 are directed to a downstream component as desired. In the implementation shown, an outlet passage 154 extends from the cover 118 downstream of the valve seat 134 and to an intake manifold of the engine (e.g. via the throttle bores 20). While the outlet passage 154 is shown as being defined at least in part in a conduit that is routed outside of the cover 118 and throttle body 18, the outlet passage 154 could instead be defined at least in part by one or more bores or voids formed in the throttle body and/or cover, and or by a combination of internal voids/passages and external conduit (s).

In at least some implementations, the cover 118 defines part of the inlet chamber 100 and the vent passage 102 extends at least partially within the cover and communicates at a first end with the inlet chamber 100 and at a second end with an outlet from the throttle body (e.g. the cover). The vent valve 130 and valve seat 132 are disposed between the first and second ends of the vent passage 102 so that the vent valve controls the flow through the vent passage. In the implementation shown, the vent passage 102 is entirely within the cover 118, and the vent valve 130 is carried by the cover, e.g. within the cavity formed in the cover.

In at least some implementations, a pressure in the vent passage 102 can interfere with the fuel flow from the inlet chamber 100 to the fuel metering valve 28 and throttle bore 20. For example, when the vent passage 102 is communicated with the intake manifold or with an air cleaner box/filter, a subatmospheric pressure may exist within the vent passage. The subatmospheric pressure, if communicated with the inlet chamber 100, can reduce the pressure within the inlet chamber and reduce fuel flow from the inlet chamber. Accordingly, closing the vent valve 130 can inhibit or prevent communication of the subatmospheric pressure from the vent passage 102 with the inlet chamber 100. A pressure sensor responsive to pressure in the vent passage 102 or in, for example, the intake manifold, may provide a signal that is used to control, at least in part, the actuation of the vent valve 130 as a function of the sensed pressure to improve control over the pressure in the inlet chamber. Also or instead, the vent valve 130 may be closed to permit some positive, superatmospheric pressure to exist within the inlet chamber 100 which may improve fuel flow from the inlet chamber to the throttle bore 20. And the vent valve 130 may be opened to permit engine pressure pulses (e.g. from the intake manifold) to increase the pressure within the inlet chamber 100. As noted above, the opening of the vent valve 130 may be timed with such pressure pulses by way of a pressure sensor or otherwise. These examples permit better control over the fuel flow from the inlet chamber 100 and thus, better control of the fuel and air mixture delivered from the throttle bore 20. In this way, the vent valve 130 may be opened and closed as desired to vent gasses from the inlet chamber 100 and to control the pressure within the inlet chamber.

Still further, it may be desirable to close the vent passage 102 to avoid the fuel in the inlet chamber 100 from going stale over time (due to evaporation, oxidation or otherwise), such as during storage of the device with which the throttle body assembly 10 is used. In this way, the vent valve 130 may be closed when the device is not being used to reduce the likelihood or rate at which the fuel in the throttle body assembly 10 becomes stale.

Finally, when the vent valve strokes from open to closed, the armature and valve element 132 movement displace air/vapor in the vent passage 102 toward and into the inlet chamber 100 which may raise the pressure in the inlet chamber. Repeated actuations of the vent valve 130 may then provide some pressure increase, even if relatively small, that facilitates fuel flow from the inlet chamber 100 to the throttle bore 20.

In at least some implementations, the pressure within the inlet chamber 100 may be controlled by actuation of the vent valve 130, to be between 0.34 mmHg to 19 mmHg. In at least some implementations, the vent valve 130 may be opened and closed repeatedly with a cycle time of between 1.5 ms to 22 ms. And in at least some implementations, the vent valve 130 may be controlled at least when the throttle valve is at least 50% of the way between its idle and wide open positions (e.g. between 50% and 100% of the angular rotation from idle to wide open), for example, because the intake manifold pressure may be greater in that throttle position range and thus, more likely to interfere with the pressure in the inlet chamber.

The vent valve 130 may be actuated by a controller 162 (FIGS. 1, 4 and 5) that controls when electrical power is supplied to the solenoid 136. The controller 162 may be the same controller that actuates the fuel metering valve 28 or a separate controller. Further, the controller 162 that actuates one or both of the vent valve 130 and the fuel metering valve 28 may be mounted on or otherwise carried by the throttle body assembly 10, or the controller may be located remotely from the throttle body assembly, as desired. In the example shown, the controller 162 is carried within a sub-housing 164 that is mounted to the throttle body 18 and/or cover 118, or otherwise carried by the housing (e.g. the body and/or cover), and which may include a printed circuit board 166 and a suitable microprocessor 168 or other controller for actuation of the metering valve 28, vent valve 130 and/or the throttle valve (e.g. when rotated by a motor 62 as shown and described above). Further, information from one or more sensors may be used to control, at least in part, operation of the vent valve, and the sensor(s) may be communicated with the controller that controls actuation of the vent valve.

The dual bore throttle body and fuel injection assembly may be used to provide a combustible fuel and air mixture to a multi-cylinder engine. The assembly may improve cylinder to cylinder air-fuel ratio balancing, engine starting, and overall run quality and performance compared to an assembly having a single throttle bore and a single fuel injector or point/location of fuel injection.

The system or assembly may include a low pressure fuel injection system described above with the any following additional options: a single throttle body assembly with a plurality of throttle bores; one or more vapor separators integrated into the throttle body assembly; at least one injector per throttle bore; optional boost venturi for the injector(s); a single engine control module/controller; a single throttle shaft including multiple throttle valve heads on the shaft, one in each throttle bore; a single throttle position sensor; may include a single throttle actuator which may be electronically controlled; may include two ignition coils or a double-ended ignition coil.

Figure 7:
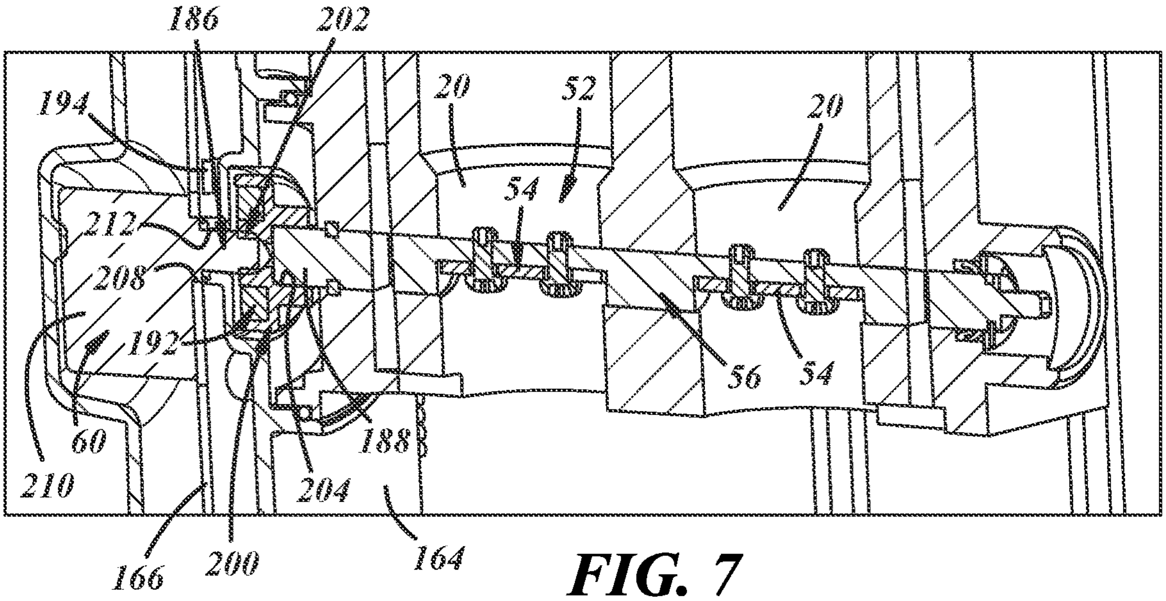
FIG. 7 is a fragmentary sectional view of a throttle body assembly including an actuator driven throttle valve and a position sensing arrangement.

As shown in FIG. 7 a throttle body or other charge forming device may include one or more throttle bores 20, and a throttle valve 52 associated with each throttle bore 20. The throttle valves 52 may be separate or a single throttle valve shaft 56 may include multiple valve heads 54 that rotate with the shaft 56 between a first or idle position and a second or open position which may be a wide open or fully open position. In the example shown in FIG. 4, the throttle valve shaft 56 has two valve heads 54 mounted thereon, which are shown as thin discs in a dual butterfly valve arrangement. In the first position, the valve heads 54 are generally perpendicular to fluid flow through the throttle bores 20 and provide a maximum restriction to fluid flow through the throttle bores 20 (where generally perpendicular includes perpendicular and orientations within 15 degrees of perpendicular). In the second position, the valve heads 54 are generally parallel to fluid flow through the throttle bores 20 and may provide a minimum restriction to fluid flow through the throttle bores 20 (where generally parallel includes parallel and orientations within 15 degrees of parallel).

As noted above, the throttle valve 52 may be driven or moved by the actuator 60 which may be an electrically driven motor 62 coupled to the throttle valve shaft 56 to rotate the shaft and thus rotate the valve heads 54 within the throttle bores 20. As shown in FIG. 4, a coupler 180 may drivingly connect the actuator 60 to the throttle valve shaft 56. The coupler 180 may include a first recess 182 in which an end 184 of the throttle valve shaft 56 is received and a second recess 185 in which a drive shaft 186 of the actuator 60 is received. Thus, the coupler 180 in at least some implementations may be a component formed separately from the throttle valve shaft 56 and the drive shaft 186. Suitable anti-rotation features may be provided between the coupler 180 and shafts 56 and 186 (e.g. complementary noncircular portions or surfaces) so that the throttle valve shaft 56 is rotated when the drive shaft 186 rotates. If desired, the coupler may be flexible, that is, it may twist or flex somewhat to reduce impulse forces from rapid movements (e.g. larger accelerations or decelerations) of the assembly. And the coupler 180 may be resilient so that it untwists or unflexes so that the amount of commanded rotation of the throttle valve 52 is achieved when the force causing the twisting is removed or sufficiently reduced (that is, the rotation of the actuator 60 is accurately transmitted to and results in the same amount of rotation of the throttle valve 52).

In FIG. 4, the coupler 180 is arranged on the end 184 of the valve shaft 56 opposite to and end 188 of the valve shaft 56 that is adjacent to the circuit board 166. That end 188 of valve shaft 56 includes or is connected to a second coupler 190 that carries a sensor element 192 that rotates with the valve shaft 56. A sensor 194 responsive to the movement of the sensor element 192 may be mounted to the circuit board 166 or elsewhere as desired. In at least some implementations, the sensor element 192 is a magnet and the sensor 194 is responsive to movement of the magnetic field of the magnet 192 when the valve shaft 56 is rotated. This provides a non-contact sensor arrangement that enables accurate determination of the rotary or angular position of the throttle valve.

Figure 8:
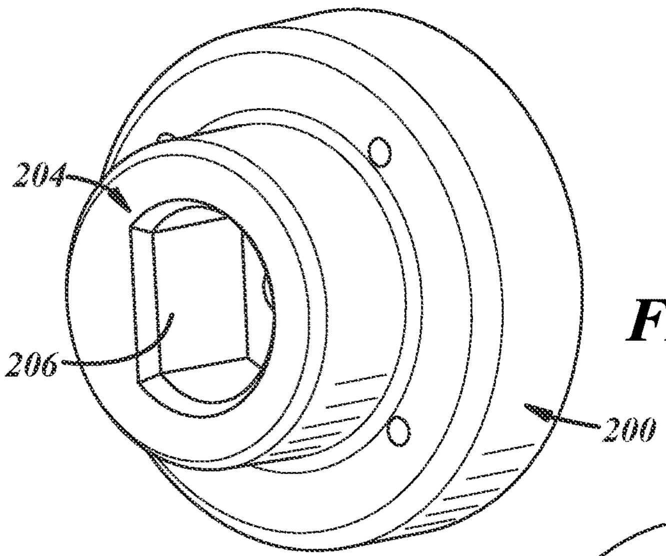
FIG. 8 is a perspective view of a coupler.
Figure 9:
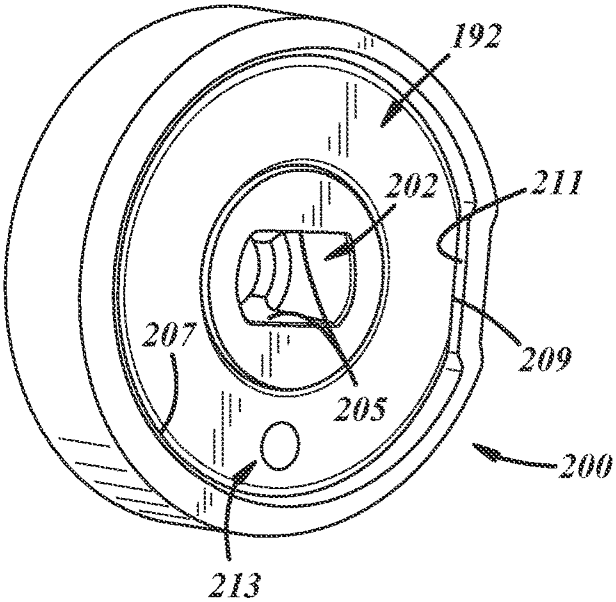
FIG. 9 is another perspective view of the coupler.

In FIG. 7, a coupler 200 interconnects the actuator 60 with the valve shaft 56 and also carries or otherwise includes the sensor element 192. This coupler 200 is mounted on the end 188 of the valve shaft 56 that is adjacent to the circuit board 166 and/or the sensor 194. As shown in FIGS. 7-9, the coupler 200 has a first drive feature 202 engaged with the drive shaft 186 of the actuator 60 for co-rotation of the coupler 200 with the drive shaft 186, and a second drive feature 204 engaged with the valve shaft 56 for co-rotation of the valve shaft 56 and coupler 200. The drive features 202, 204 may include recesses or sockets into which portions of the shafts 56, 186 extend, with non-circular portions or surfaces that prevent relative rotation of the coupler 200 relative to either shaft 56, 186, or the coupler may include projections that are received in sockets or cavities in the shafts 56, 186 or some combination of such features. In the example shown, the first drive feature 202 includes two oppositely facing flat surfaces 205 (FIG. 9) and the drive shaft end 188 is complementarily shaped, and the second drive feature 204 includes one flat surface 206 (FIG. 8), is generally D-shaped and the drive shaft 186 is complementarily shaped. Of course, other noncircular shapes and arrangements may be used as desired. The drive features 202, 204 could also be circular, if desired, and also if desired, an adhesive, set screw or other connection may be provided between the shafts 56, 186 and the coupler 200 to provide the desired co-rotation. As described above, the coupler 200 may be formed from an at least somewhat flexible material to, for example, damp impulse forces and vibrations, and is also resilient so that the desired or commanded rotation of the valve shaft 56 ultimately occurs.

The coupler 200 may include a cavity 207 in which the magnet 192 is received, and the magnet 192 and cavity 207 may have complementary anti-rotation features 209, 211 that inhibit or prevent rotation of the magnet 192 relative to the coupler 200. The anti-rotation features 209, 211 may include engaged flat surfaces (e.g. a surface that defines the cavity and an exterior surface of the magnet) or other complementary non-circular geometric features, and/or an adhesive or other connector may be used between the magnet 192 and coupler 200. Thus, the rotational position of the magnet 192 can more accurately represent the rotational position of the coupler 200 and valve shaft 56. To facilitate proper assembly and/or calibration of the sensor assembly, or for other reasons, a marking 213 or some indicia may be provided on the magnet 192 to indicate a polarity of that portion of the magnet. In the example shown, the magnet 192 can be received in the cavity 207 in two different orientations (e.g. it may be flipped over) and the indicia may help to ensure that the magnet 192 is installed in the desired orientation.

In at least some implementations, as shown in FIG. 7, one of the drive shaft 186 or valve shaft 56 extends through a void 208 in the circuit board 166. This enables the sensor element 192 to be located close to the sensor 194 (e.g. less than 8 mm away) to improve position sensing. In the example shown, a motor 210 of the actuator 60 is on a first side of the circuit board 166 and the coupler 200 is on the opposite, second side of the circuit board 166, and the drive shaft 186 extends through the void 208 in the circuit board, and an aligned void/boss 212 in the sub-housing 164 which may support and guide rotation of the drive shaft 186. The valve shaft 56 could instead extend through the void 208 in the circuit board 166, and the coupler 200 and drive shaft 186 could be located on the first side of the circuit board 166, which is the side opposite to the throttle bores 20.

Figure 10:
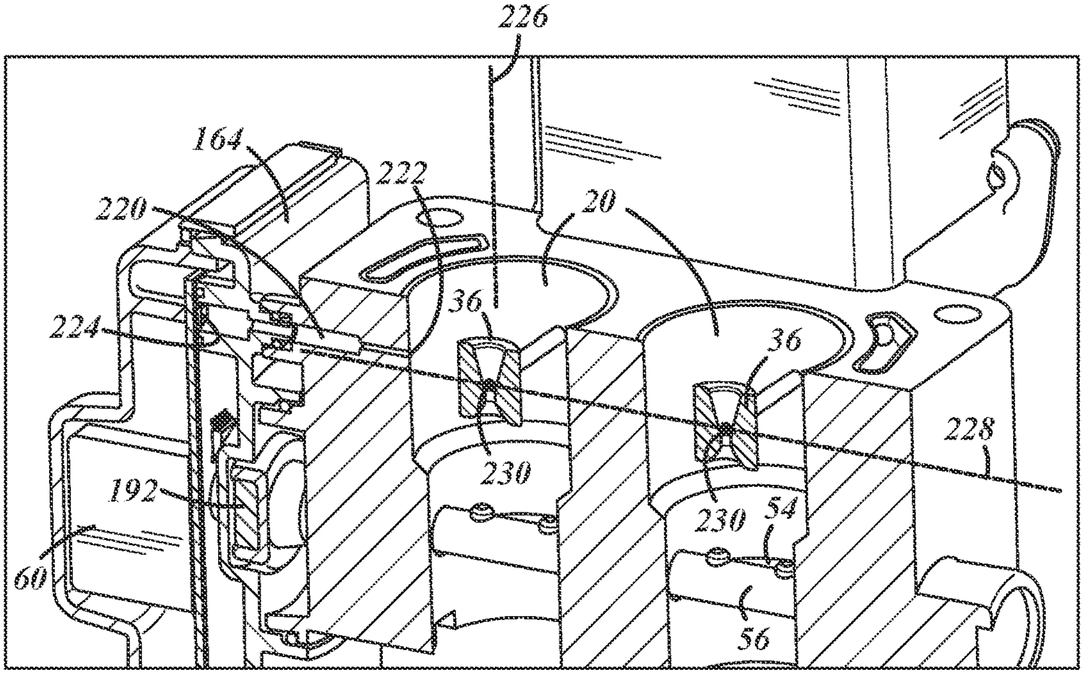
FIG. 10 is a fragmentary sectional view of a throttle body assembly having two throttle bores.

In the throttle body shown in FIG. 10, a passage 220 is provided that communicates at a first end 222 with a throttle bore 20. The passage also communicates with a pressure sensor 224, which is shown as being mounted to the circuit board 166. Thus, the passage 220 in this implementation extends through the sub-housing 164 to a second end that is open to an area in which the pressure sensor 224 is located. The pressure in the throttle bore 20 in the area of the first end 222 of the passage 220 is communicated with the pressure sensor 224 which provides an output signal that corresponds to the sensed pressure.

In at least some implementations, the first end 222 of the passage 220 is arranged near an area in which fuel is injected into the throttle bore 20. The throttle bore has an axis 226. In at least some implementations, an imaginary plane 228 that is perpendicular to the axis 226, and which extends through the center of the injection port 230 through which fuel enters the throttle bore 20, intersects or is within 1-inch of the first end 222 of the passage 220. In the example shown, fuel enters the throttle bore 20 through a port 230 that is formed in a boost venturi 36 located within the throttle bore 20, as described above, with reference to, for example, FIG. 4. Of course, other arrangements may be used. Thus, the output from the pressure sensor 224 is indicative of the pressure in the area of the fuel injection port 230 and is thus indicative of the pressure that acts on fuel at the injection port 230. In at least some implementations, the timing of the fuel injection may be coordinated or chosen as a function of this sensed pressure, to control fuel flow into the throttle bore 20. Also, upon energization of the controller 162, which may occur before the engine is started, the controller 162 can interrogate or receive a signal from the pressure sensor 224 for a reference value of barometric pressure, which may be used to determine an initial ignition timing and/or fuel/air mixture calibration or for other engine control purposes.

Figure 11:
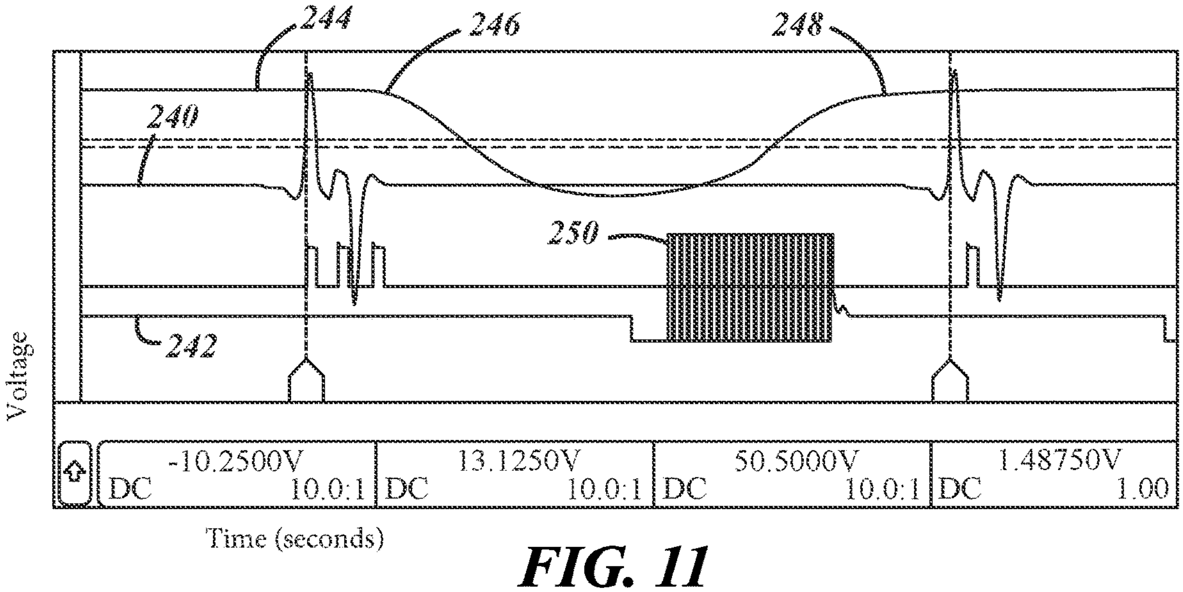
FIG. 11 is a graph showing waveforms associated with ignition events, pressure near an injector carried by the throttle body and injector events.

In the graph shown in FIG. 11, a first waveform 240 relates to a voltage induced in a coil of an engine ignition system, such as by a magnet mounted to an engine flywheel. A second waveform 242 relates to a fuel metering valve or fuel injector control signal, that is, the waveform shows when a voltage is applied to open the fuel injector(s) as described above. And a third waveform 244 shows the pressure sensed by the sensor 224. A little more than one engine revolution is shown in this graph, as can be seen by the two instances in the ignition coil/sensor waveform 240 wherein a flywheel magnet induced voltage in the ignition system coil. Within this engine revolution, the pressure at sensor 224 decreased between points 246 and 248 as an engine intake valve opened and a downward-travelling piston creates a negative relative pressure in the engine intake. There generally is no negative or positive relative pressure signal when the intake valve is closed. The time when the negative pressure occurs at the injection location, which may or may not occur within the throttle body (that is the injector could be located outside of the throttle body and the pressure may be taken in the area of the injector outlet, as noted above), is the optimum time for a low-pressure injection system to open the injector and control the injection of fuel as a greater flow rate of fuel may be achieved with this negative engine pressure signal which aids fuel flow from the port 230.

In general, the greater the magnitude of the negative relative pressure, the more fuel will flow from the injector for a given amount of time in which the injector is open and permits fuel flow. Thus, the start of the negative pressure, generally indicated at 246, to the end of the negative pressure, generally indicated at 248, may be the optimum time period within which to inject fuel, at least where the pressure is measured at or very near the location of injection. Of course, in at least some situations, fuel may be provided only during a portion of the negative pressure signal, and improved control of the fuel injection event may be enabled by timing the injection event to a desired portion of the negative pressure signal which does not necessarily include the maximum relative pressure.

Thus, the injection timing can be controlled as a function of the instantaneous pressure at or near the injection outlet or port. The pressure may be continuously measured or sensed, or sampled at fixed rate, as desired. Further, the injection event may be tied to one or more pressure thresholds so that a known flow rate of fuel can be achieved and the efficiency of the fuel injection events can be improved. In the example shown in FIG. 11, a signal indicated at 250 is provided from a controller to the fuel injector (or fuel metering valve which may considered to be a fuel injector) to open a valve of the fuel injector and cause fuel to flow when the pressure signal exceeds a threshold relative pressure. Thus, until the pressure signal exceeds the threshold, the injector valve is closed and fuel is not delivered from the injector. The injection strategies described herein may improve fuel injection efficiency, in, but not limited to, situations in which a sensed or calculated crankshaft angular position may not be as accurate as desired, such as during engine acceleration or deceleration. Additionally, any changes in the pressure signal due to degradation of the engine system (pumping efficiency due to wear, air filter being plugged, etc) can be compensated for to continue to inject fuel at optimum relative negative pressure, despite the change in shape, magnitude, or timing of the relative negative pressure pulse (which calibration based on engine crankshaft angular displacement/position cannot instantaneously compensate for).

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

As used in this specification and claims, the terms "for example," "for instance," "e.g.," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A charge forming device, comprising:

a body that has a throttle bore;

a throttle valve associated with the throttle bore, the throttle valve having a valve head received within and movable relative to the throttle bore, and a valve shaft to which the valve head is coupled;

a coupler connected to the valve shaft, the coupler carrying or including a sensor element; and an actuator having a drive shaft coupled to the coupler so that rotation of the drive shaft is transmitted to the coupler and the valve shaft.

2. The device of claim 1 wherein the coupler includes a first drive feature engaged with the drive shaft and a second drive feature engaged with the valve shaft.

3. The device of claim 1 wherein the coupler includes an anti-rotation feature and the sensor element includes an anti-rotation feature that is engaged with the anti-rotation feature of the coupler to prevent rotation of the sensor element relative to the coupler.

4. The device of claim 3 wherein the anti-rotation features of both the coupler and the sensor element are defined by at least one flat surface.

5. The device of claim 3 wherein the coupler includes a cavity in which the sensor element is at least partially received, and the anti-rotation feature of the coupler is defined by a surface that defines the cavity.

6. The device of claim 1 wherein the coupler is flexible and may twist to permit movement of drive shaft relative to the throttle valve shaft when sufficient force is applied to the coupler, and wherein the coupler is resilient so that the coupler untwists when the force causing the twisting is decreased sufficiently to permit untwisting of the coupler.

7. The device of claim 1 which also includes a circuit board and a sensor on the circuit board that is responsive to movement of the sensor element, and wherein the coupler is mounted to an end of the throttle valve shaft that is closest to the circuit board.

8. The device of claim 7 wherein the throttle valve shaft or the drive shaft extends through a void in the circuit board.

9. The device of claim 7 wherein the actuator is located adjacent to a first side of the circuit board and the coupler is located adjacent to a second side of the circuit board that is opposite to the first side.

* * * * *